United States Patent [19]

Kitajima et al.

[11] Patent Number: 5,293,221
[45] Date of Patent: Mar. 8, 1994

[54] LEVEL SENSOR

[75] Inventors: Eiichi Kitajima, Yokohama; Akihiko Morishita, Kawasaki; Shigeru Isono, Odawara, all of Japan

[73] Assignee: Nikon Corporation, Tokyo, Japan

[21] Appl. No.: 845,659

[22] Filed: Mar. 4, 1992

[30] Foreign Application Priority Data

Mar. 8, 1991 [JP] Japan .................. 3-20383[U]
Oct. 11, 1991 [JP] Japan .................. 3-82767[U]

[51] Int. Cl.⁵ .......................................... G01B 11/26
[52] U.S. Cl. ................................ 356/400; 33/293; 356/152
[58] Field of Search ............. 356/138, 152, 153, 400; 33/286, 293, DIG. 21

[56] References Cited

U.S. PATENT DOCUMENTS 4,674,870 6/1987 Cain et al. ......................... 356/152
4,676,634 6/1987 Petersen ............................... 356/4
4,752,539 6/1988 Vatter .................................. 429/1

FOREIGN PATENT DOCUMENTS 0235044 9/1987 European Pat. Off. .

Primary Examiner—F. L. Evans
Attorney, Agent, or Firm—Shapiro and Shapiro

[57] ABSTRACT

A level sensor detects a vertical position of a laser beam emitted from an electronic leveling apparatus and comprises a photo-sensing unit having a predetermined vertical length for detecting the laser beam, a plurality of marking indices arranged on a side edge of a housing of the level sensor at a predetermined pitch along the vertical direction of the laser beam, and analog display unit having a plurality of display devices one for each of the marking indices for displaying a change in an incident position of the laser beam along the vertical direction by selective activation of the display devices.

16 Claims, 4 Drawing Sheets

LEVEL SENSOR

BACKGROUND OF THE INVENTION

1. Field of the Invention

The present invention relates to a level sensor which measures a level by utilizing a laser beam emitted from an electronic leveling apparatus.

2. Related Background Art

A prior art level sensor shown in FIG. 1 comprises a photo-sensing unit 4 which detects a laser beam emitted from an electronic leveling apparatus at a constant rotating speed and an LCD display unit 3. A signal detected by the photo-sensing unit 4 is processed by a signal processing circuit having functions of amplification, peak hold and comparison to display on the LCD display unit 3 a vertical deviation of the level sensor from the laser beam. A center notch 5 is formed on one side of a housing 1 at a vertical center position of the photo-sensing unit 4. Thus, when an operator moves the photo-sensing unit 4 of the level sensor to find the center position of the laser beam, he/she can make a mark by a pencil by using the notch 5.

In the prior art level sensor, the operator first coarsely moves the level sensor, and when he/she recognizes by an audio function that the level of the laser beam is in a vicinity of a reference position, he/she finely moves the level sensor toward the reference position while he/she monitors the display unit 3. In this case, the operator must pay great attention so that the level of the laser beam does not exceed the reference position. If the level of the laser beam exceeds the reference position from carelessness, the operator must finely move the level sensor toward the reference position in the opposite direction. As a result, the marking work is troublesome and time-consuming, and the operability is poor.

SUMMARY OF THE INVENTION

In the light of the above, it is an object of the present invention to provide a level sensor which permits simple and exact marking and improves operability.

The level sensor of the present invention detects a laser beam emitted from an electronic leveling apparatus and comprises a photo-sensing unit having a predetermined vertical length for detecting the laser beam, a plurality of marking indices arranged on a side edge of a housing of the level sensor at a predetermined pitch along the vertical direction of the laser beam, and display means having a plurality of display devices, one for each of the marking indices, for displaying a change in an incident position of the laser beam along the vertical direction by selective activation of the display devices.

In one aspect of the present invention, the marking indices comprise a stepped scale having predetermined steps along the vertical direction of the laser beam, and a plurality of display devices are arranged for each step of the stepped scale. The display devices are selectively activated in accordance with the detected level. Accordingly, the operator need only mark in accordance with the position on the stepped scale which is indicated by the display device in order to mark the exact level of the laser beam.

In another aspect of the present invention, a plurality of lines are drawn to connect the marking indices and the display devices in order to show the connection between them. Accordingly, when the laser beam is detected by the photo-sensing unit and the vertical displacement of the level sensor to the laser beam is indicated by the display device, the operator may follow the line extending from the display device to determine the marking index representing the level of the laser beam.

Further, since the direction of deviation of the reference position of the level sensor from the laser beam and the amount of deviation are digitally displayed, the level sensor can be exactly and quickly moved to complete the marking operation faster.

Further, since the lines are formed by guide grooves, the operator may follow the line by moving a pencil along the guide groove to determine the corresponding marking index exactly without error. Thus, the precision of the marking operation is improved.

Where the pitch of arrangement of the lines at one end matches a detection resolution of the level sensor and the display devices are arranged at a larger pitch than the detection resolution at another end of the lines, the display devices are easily visually recognized and the marking operation is simpler and more exact.

DETAILED DESCRIPTION OF THE PREFERRED EMBODIMENTS

Figure 1:
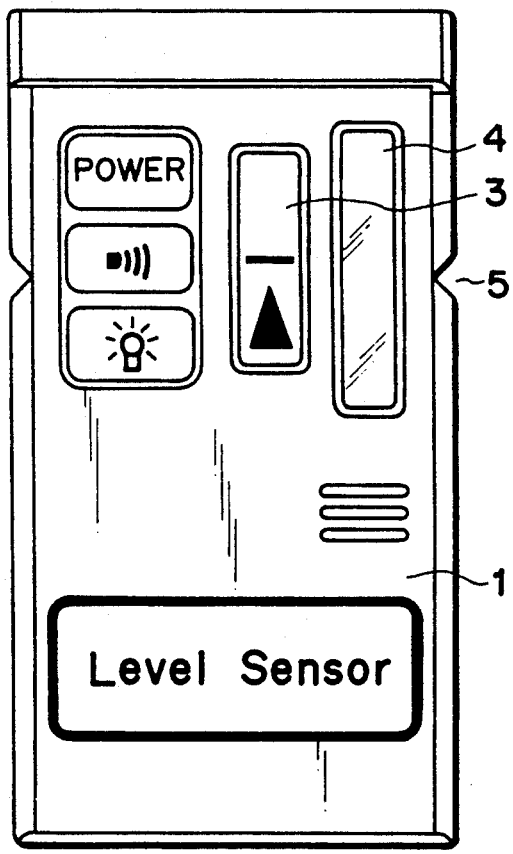
FIG. 1 shows a plan view of the exterior of a prior art level sensor.
Figure 2:
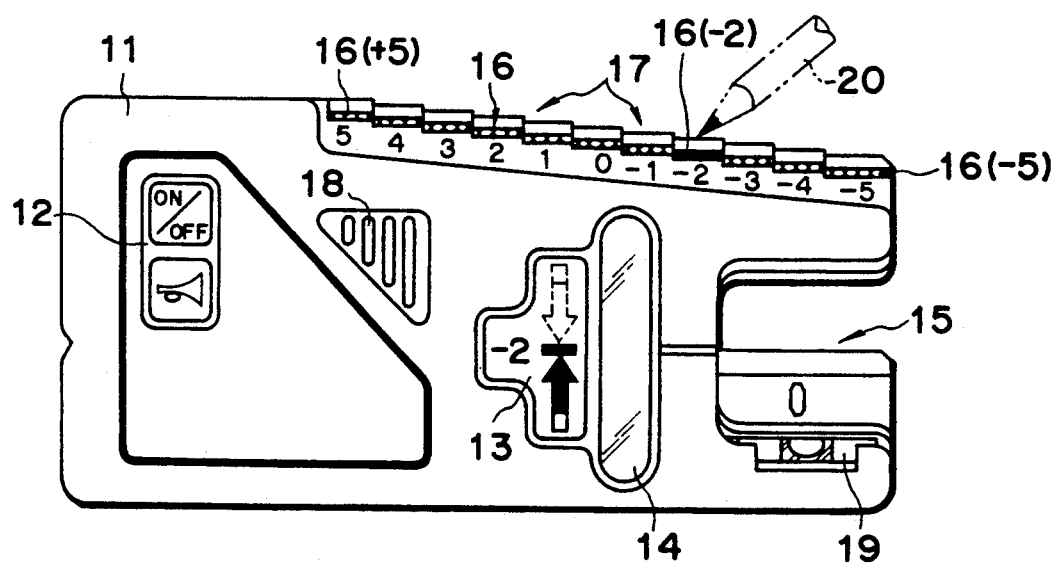
FIG. 2 show a plan view of the exterior of a first embodiment of a level sensor of the present invention.

FIG. 2 shows a first embodiment of the present invention. In the present embodiment, the level sensor has a switch unit 12, including a power switch and an audio buzzer selection switch, and a photo-sensing unit 14 for detecting a laser beam emitted from a conventional electronic leveling apparatus, housed in a resin housing 11. A vertical deviation of the level sensor from the laser beam is detected in accordance with a signal detected by the photo-sensing unit 14. An LCD first display unit 13 and an LED second display unit 16 are provided to display the displacement, and a stepped scale 17 which has scales each corresponding to each of LED devices 16(+5)–16(−5) of the second LED display unit 16 is formed. A center scale 15 to allow center marking is provided, and an air bubble tube 19 for correcting the skew of the housing 11 and a buzzer opening 18 are formed.

When the level sensor is vertically moved along the wall surface and the photo-sensing unit 14 detects the laser beam emitted from the electronic leveling apparatus, the output signal therefrom is processed by a signal processing circuit (not shown) so that an incident position of the laser beam to the photo-sensing unit is detected. Thus, the first LCD display unit 13 displays the relative displacement of the laser beam from the vertical center of the photo-sensing unit by a digital number and an arrow. The digital number is "0" for the center of the photo-sensing unit 14, and a plus or minus sign is associated with the digital number. In FIG. 2, "−2" is displayed. The LED device 16(−2) of the second LED display unit 16 which corresponds to "−2" is also energized. The stepped scale 17 having steps corresponding to the LED devices 16(+5)-16(−5) of the second LED display unit 16 has steps of 1 mm high. Thus, the operator may make a mark by a pencil 20 on the wall corresponding to the "−2" LED device 16(−2). Namely, if the displacement of the center of the photo-sensing unit 14 from the center of the laser beam is within ±5 mm, the operator can readily make the mark by following the lighting of the second LED display unit 16. Since the stepped scale 17 is formed on the top of the housing 11 of the level sensor to facilitate the marking, it is offset from the actual laser beam position. The conventional one-point detection (at the "0" position of the level sensor) may be attained by the arrow of the first LCD display unit 13 and the sensor scale 15.

Figure 3:
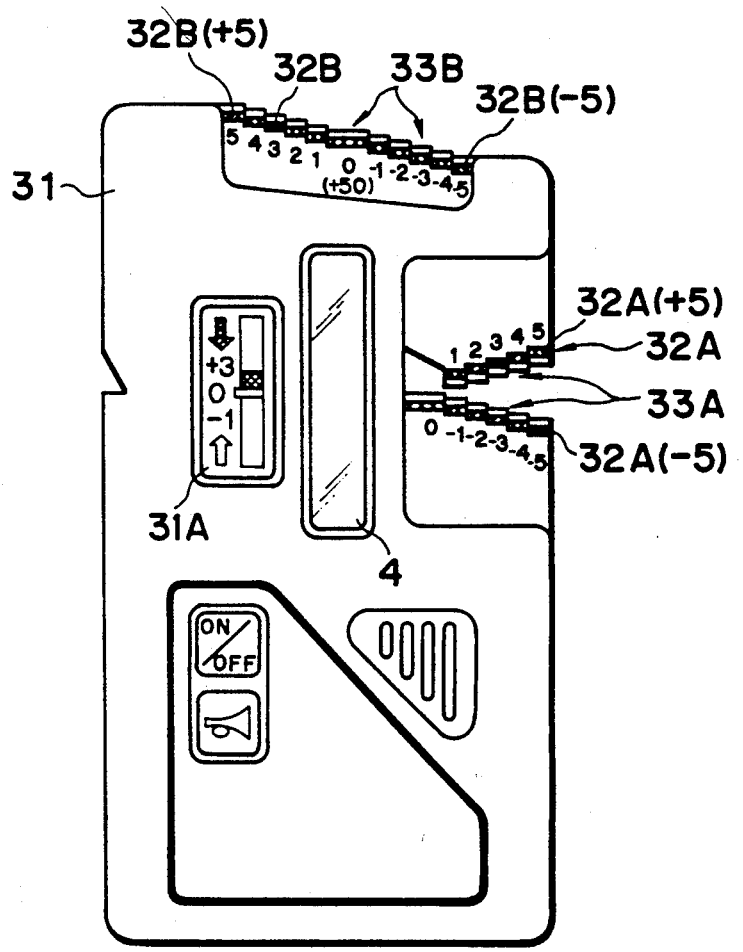
FIG. 3 shows a plan view of the exterior of a second embodiment of the level sensor of the present invention.

FIG. 3 shows a second embodiment of the present invention. It differs from the embodiment of FIG. 2 in that a first LCD display unit 31A, a second LED display unit 32A and a third LED display unit 32B for displaying an elevational position of the laser beam are provided on a longitudinal housing 31, and stepped scales 33A and 33B having steps corresponding to LED devices 32A(+5)-32A(−5) and 32B(+5)-32B(−5) of the second and third LED display units 32A and 32B, respectively, are formed. The two stepped scales 33A and 33B are vertically displaced from each other by 50 mm.

Since two stepped scales 33A and 33B are provided, the device has a wide range of application. For example, when the marking is to be made at the same level as the laser beam, the second LED display unit 32A and the stepped scale 33A may be used. On the other hand, when the marking is to be made at a position which is 50 mm higher than the laser beam, the third LED display unit 32B and the stepped scale 33B may be used. Which one of the stepped scales 33A and 33B is to be used may be selected in accordance with the type of work. Only, one of them may be activated by a switch (not shown) in order to distinguish the stepped scales 33A and 33B. The colors of the LED devices of the second and third LED display units 33A and 33B may be different from each other, for example, the second LED display unit 33A may use red LED's and the third LED display unit 33B may use green LED's.

Figure 4:
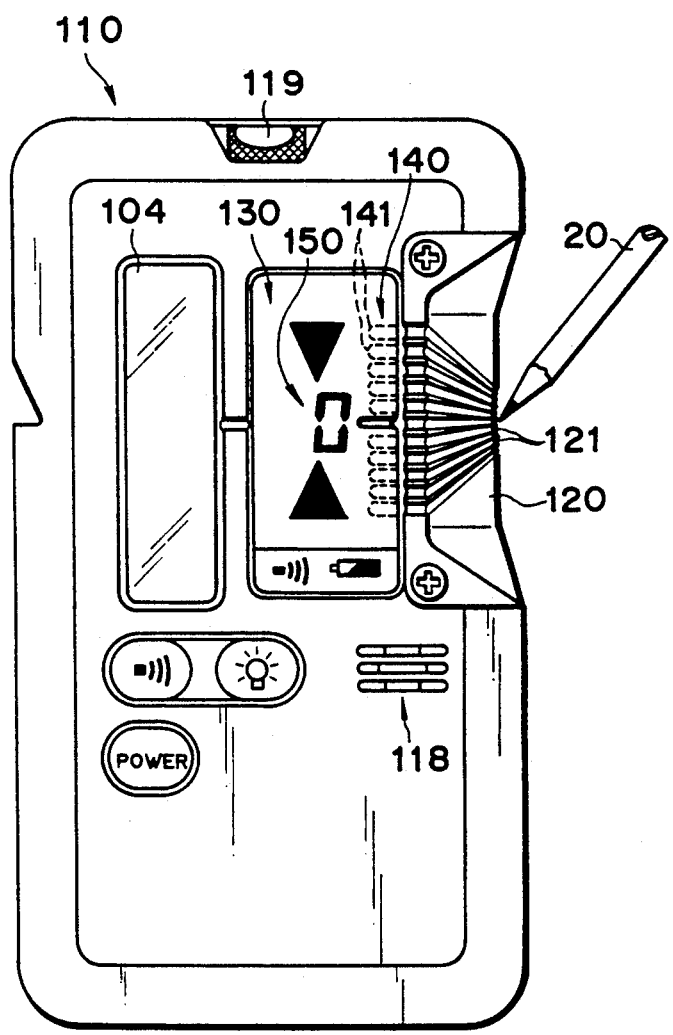
FIG. 4 shows a plan view of the exterior of a third embodiment of the level sensor of the present invention.
Figure 5:
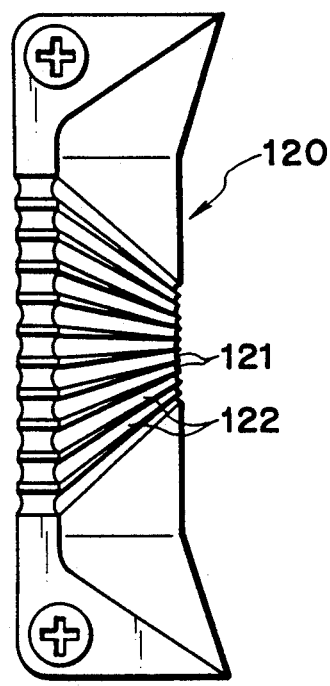
FIG. 5 shows an enlarged plan view of an attachment in a marking unit in FIG. 4.

FIG. 4 shows a third embodiment of the present invention. A portion of a side edge of a level sensor 110 is tapered and a marking plate 120 is removably attached thereto. As shown in FIG. 5, a plurality of marking indices 121 which are engraved continuously and at a vertical pitch of 1 mm are formed on the marking plate 120. The marking index at the vertical center corresponds to a reference position. In the present embodiment, a detection resolution of the level sensor 110 is 1 mm pitch.

A scale 140 and numerals 150 are displayed on an LCD display unit 130 to display a vertical displacement of the laser beam directed to the photo-sensor 104.

The scale 140 displays by selective activation of a plurality of display devices 141 arranged in correspondence with the marking indices 121 on the side of the display screen facing the marking indices 121. The pitch of arrangement of the display devices 141 may be identical to that of the marking indices 121 (1 mm). In the present embodiment, they are arranged at an enlarged pitch, for example, 3 mm in order to facilitate the reading of the scale.

The numeric display 150 displays the vertical displacement of the level sensor from the laser beam by numeral and displays the direction of displacement by an arrow.

A plurality of guide grooves 122 are formed in the marking plate 120. One end of each of the guide grooves 122 closely faces each of display devices 141 of the scale display 140, and the other end of each of the guide grooves extends to each of the marking indices 121 so that the respective display devices are associated with the respective marking indices. The guide grooves are preferably colored to facilitate selection, and they may be of V or U shape in section.

Like in the previous embodiment, when the photo-sensing unit 104 detects the laser beam emitted from the electronic leveling apparatus while the level sensor is vertically moved along the wall surface, the position of the laser beam is detected by a detection circuit (not shown). The vertical displacement of the level sensor from the laser beam is numerically displayed on the numeric display 150 of the LCD display unit 130 and the direction of displacement is displayed by the arrow. Further, one of the display devices 141 of the scale display unit 140 is lit.

At this moment, the operator stops to move the level sensor, puts a pencil into the guide groove 122 facing the activated display device 141, slips the pencil to follow the guide groove 122, drops the pencil into the marking index 121 to which the guide groove extends and marks an object such as a wall which is on the back of the level sensor.

When the guide grooves 122 are clogged by foreign materials through the extended use, the marking plate 120 may be replaced by a new one, and the entire upper case of the level sensor need not be replaced.

In the present embodiment, the guide lines are grooves although they may be differently colored lines.

Two types of marking plates 120, one in metric units and the other in English units may be provided so that either meter representation or inch representation is attached by simply changing the marking plate.

What is claimed is:

1. A level sensor for determining the position of an incident beam of radiation, comprising:
    a housing;
    photo-sensing means provided on said housing for sensing the beam to detect displacement of a reference position of said housing relative to the beam along a predetermined direction;
    a plurality of marking indices arranged at respective positions along said predetermined direction on said housing; and
    means responsive to said photo-sensing means for indicating, at different displacements of said reference position relative to the beam along said predetermined direction, which of said marking indices has a predetermined positional relationship to the beam along said predetermined direction.

2. A level sensor according to claim 1, wherein said marking indices are disposed to either side of said reference position along said predetermined direction and said predetermined positional relationship corresponds to alignment with the beam along said predetermined direction.

3. A level sensor for determining the position of an incident beam of radiation, comprising:
    a housing;

photo-sensing means provided on said housing for sensing the beam to detect displacement of a reference position of said housing relative to the beam along a predetermined direction;

a plurality of marking indices arranged at respective positions on said housing along said predetermined direction; and means including a plurality of display devices corresponding to the respective marking indices and adapted to be selectively driven responsive to said photo-sensing means for indicating, at different displacements of said reference position relative to the beam along said predetermined direction, which of said marking indices has a predetermined positional relationship to the beam along said predetermined direction.

4. A level sensor according to claim 3, wherein said marking indices are arranged on a side edge of said housing.

5. A level sensor according to claim 3, wherein said marking indices are arranged at a predetermined pitch in said predetermined direction.

6. A level sensor according to claim 3, wherein said display devices are disposed near their corresponding marking indices.

7. A level sensor according to claim 6, wherein said marking indices include a plurality of steps at different heights along said predetermined direction.

8. A level sensor according to claim 3, wherein said marking indices are disposed to either side of said reference position along said predetermined direction and said predetermined positional relationship corresponds to alignment with the beam along said predetermined direction.

9. A level sensor according to claim 8, wherein said marking indices include a plurality of steps at different heights along said predetermined direction.

10. A level sensor according to claim 9, wherein said display devices are disposed near their corresponding marking indices.

11. A level sensor for determining the position of an incident beam of radiation, comprising:

a housing;

photo-sensing means provided on said housing for sensing the beam to detect displacement of a reference position of said housing relative to the beam along a predetermined direction;

a plurality of marking indices arranged at respective positions on said housing along said predetermined direction;

means including a plurality of displays devices corresponding to the respective marking indices and adapted to be selectively driven responsive to said photo-sensing means for indicating, at different displacements of said reference position relative to the beam along said predetermined direction, which of said marking indices is aligned with the beam in said predetermined direction; and means for visually indicating the correspondence of said marking indices with said display devices.

12. A level sensor according to claim 11, wherein said marking indices are arranged on a side edge of said housing.

13. A level sensor according to claim 11, wherein said visual indicating means includes a plurality of lines each connecting a respective one of said marking indices to the corresponding display device.

14. A level sensor according to claim 13, wherein said lines are in the form of guide grooves.

15. A level sensor according to claim 13, wherein said marking indices are arranged at a predetermined pitch equal to the resolution of detection of said displacement, and said display devices are arranged at a larger pitch than said predetermined pitch.

16. A level sensor according to claim 13, wherein said marking indices and said lines are formed on a marking plate member removably attached to said housing.

* * * * *